United States Patent [19]

Swansiger

[11] Patent Number: 4,762,685
[45] Date of Patent: Aug. 9, 1988

[54] APPARATUS TO RECOVER TRITIUM FROM TRITIATED MOLECULES

[75] Inventor: William A. Swansiger, Livermore, Calif.

[73] Assignee: The United States of America as represented by the United States Department of Energy, Washington, D.C.

[21] Appl. No.: 919,167

[22] Filed: Oct. 15, 1986

Related U.S. Application Data

[62] Division of Ser. No. 661,852, Oct. 17, 1984, Pat. No. 4,657,747.

[51] Int. Cl.$^4$ .................. G21F 9/06; B01D 59/28; C01B 3/10
[52] U.S. Cl. .................................................. 422/159
[58] Field of Search ........................................ 422/159

[56] References Cited

U.S. PATENT DOCUMENTS

| 3,954,654 | 5/1976 | Bernard | 252/301.1 |
| 3,976,888 | 8/1976 | Miller et al. | 250/500 |
| 4,297,165 | 10/1981 | Breuckner | 376/103 |
| 4,370,298 | 1/1983 | Marwick et al. | 376/317 |

OTHER PUBLICATIONS

M. Hadzisehovic et al., "Possibility of Application of Metallic Uranium as a Reducing Agent for Tritiated Water", Nuclear Instruments & Methods, pp. 73-74, 1973.
Bartlit et al., "Engineering Problems of Fusion Research", Proceedings of Ninth Symposium, Chicago, IL, IEEE 1981, pp. 2084-2087.
Anderson et al., "Vacuum Applications for the Tritium Systems Test Assembly", J. Vac. Sci. Technol. A 1(2), Apr.-Jun. 1983, pp. 849-855.
R. E. Wilson et al., "Isothermal Reaction of Uranium with Steam Between 400 & 1600° C.", Nucl. Sci. & Eng. vol. 25, pp. 109-115, 1966.
V. K. Gabrielson, SAHARA: A Multidimensional Heat Transfer Computer Code, Sandia National Laboratories SCL-DR-720024, pp. 3-88, Sep. 1972.

*Primary Examiner*—Edward A. Miller
*Attorney, Agent, or Firm*—Anne D. Daniel; James H. Chafin; Judson R. Hightower

[57] ABSTRACT

An apparatus for recovering tritium from tritiated compounds is provided, including a preheater for heating tritiated water and other co-injected tritiated compounds to temperatures of about 600° C. and a reactor charged with a mixture of uranium and uranium dioxide for receiving the preheated mixture. The reactor vessel is preferably stainless steel of sufficient mass so as to function as a heat sink preventing the reactor side walls from approaching high temperatures. A disposable copper liner extends between the reaction chamber and stainless steel outer vessel to prevent alloying of the uranium with the outer vessel. The uranium dioxide functions as an insulating material and heat sink preventing the reactor side walls from attaining reaction temperatures to thereby minimize tritium permeation rates. The uranium dioxide also functions as a diluent to allow for volumetric expansion of the uranium as it is converted to uranium dioxide.

14 Claims, 1 Drawing Sheet

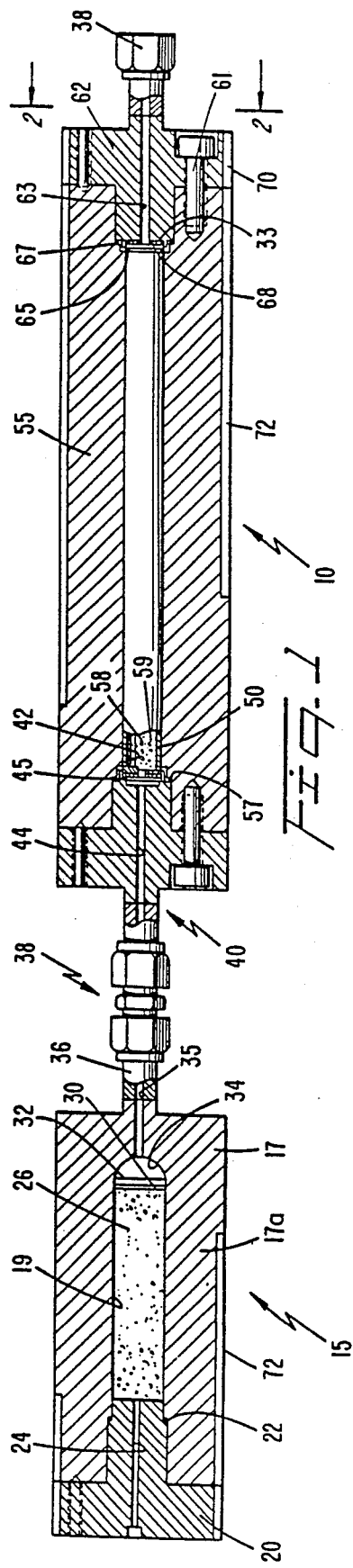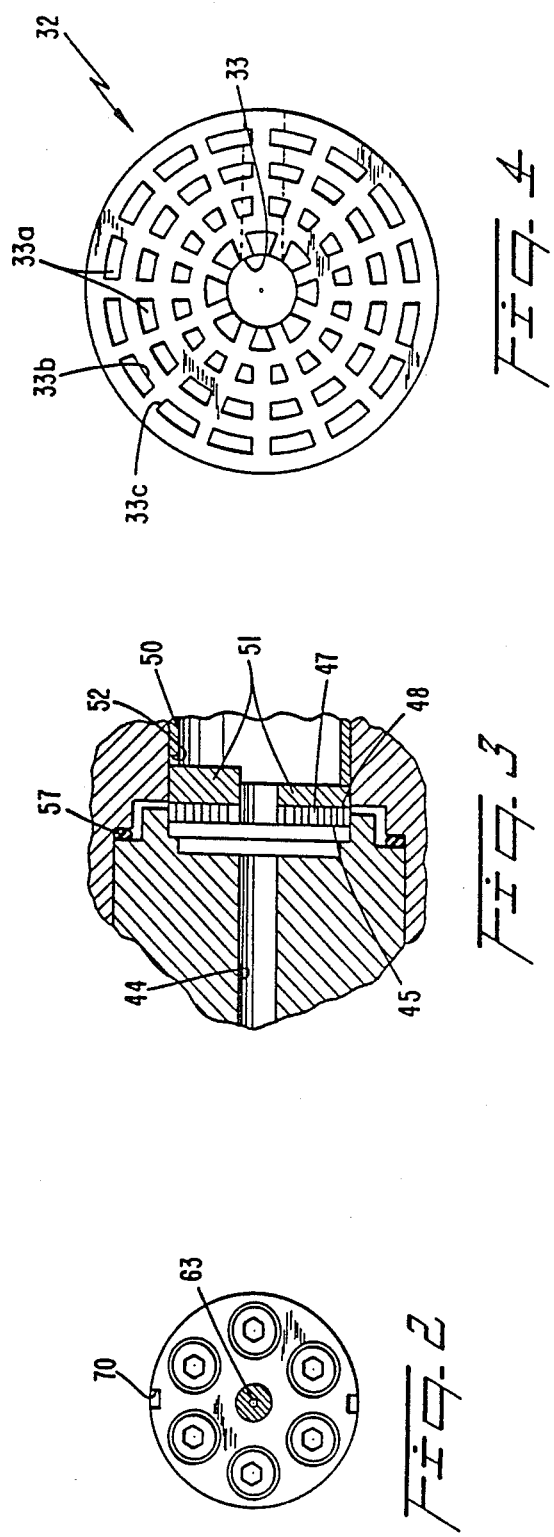

APPARATUS TO RECOVER TRITIUM FROM TRITIATED MOLECULES

BACKGROUND OF THE INVENTION

The U.S. government has rights in this invention pursuant to Contract No. DE-AC04-76DP00789 between the U.S. Department of Energy and AT & T Technologies, Inc.

This is a division of application Ser. No. 661,852 filed Oct. 17, 1984, now U.S. Pat. No. 4,657,747.

This invention relates to appratus for the recovery of tritium from various tritiated molecules by reaction with uranium. More particularly, the invention relates to the recovery of tritium from tritiated molecules by reaction with uranium wherein the reaction is conducted in a reactor which permits the reaction to occur as a moving front reaction from the point where the tritium enters the reactor charged with uranium down the reactor until the uranium is exhausted.

BACKGROUND ART

In a fusion reactor wherein quantities of tritium are processed to produce energy, tritium containment systems are necessary to reduce, for example, a quantity of tritium which would otherwise be buried as tritiated water as the result of an accidental release of tritium into a glove box. Practically all tritium containment systems are based on the catalytic oxidation of tritium to tritiated water followed by freeze-out of the water or adsorption on molecular sieves. Water is produced in the fuel cleanup system in addition to tritiated species such as methane and ammonia. Because of the high cost and toxicity of tritium, its recovery from these compounds is important.

The possibility of using metallic uranium as a reducing agent for tritiated water is discussed in a publication by Hadzisehovic, published in "Nuclear Instruments and Methods" 112 1973, pp. 73–4. In this publication, the author presents results of an investigation into the possibility of using metal uranium as a reducing agent for conversion of tritiated water to hydrogen. It was found in these experiments that water is reduced quantitatively by passing steam over heated uranium metal in a vacuum at temperatures of 450°–600° C. and that the hydrogen yield is quantitative within the limits of experimental error of determination of 0.7%. The reduction of water provided pure hydrogen in the temperature interval investigated. The authors pointed out that the reaction of water with uranium belongs to a complex group of reversible reactions because uranium will form oxides with water and a hydride whose stability will depend on the temperatures. The experiments conducted by the author concluded that uranium may be used as a reducing agent of tritiated water, and that the yield of hydrogen is quantitative in temperatures from 450°–600° C.

At the above temperatures, there is incomplete utilization of the uranium metal. Also, these temperatures are not hot enough to decompose tritiated ammonia or methane. To obtain either 100% utilization of uranium or to recover tritium from dilute mixtures of tritiated ammonia and methane, reaction temperatures in excess of 1000° C. are preferred. However, heating of existing, known reactors to temperatures of about 1000° C. is not feasible due to material compatibility problems (i.e., the alloying of uranium with reactor material) and loss of tritium due to permeation through the reactor walls.

The reaction of tritiated compounds with hot uranium to produce tritium and uranium oxides, carbides and nitrides is attractive in consideration of applications where the quantity of contaminated waste produced is not considered excessive. The present invention provides apparatus by which tritium can be completely recovered by reaction of tritiated compounds with uranium.

SUMMARY OF THE INVENTION

Accordingly, one object of the present invention is to provide a method by which tritium can be recovered from tritiated water by reaction with uranium.

A further object of the invention is to provide a reactor construction and system enabling complete recovery of tritium by reaction of tritiated species such as methane, ammonia or water with hot uranium to form uranium carbides, nitrides, and oxides.

Another object of the invention is to provide a reactor formed from inexpensive materials that allows reaction temperatures greater than 1100° C. to occur within the reactor chamber and which efficiently transfers heat to maintain the reactor walls at low temperatures of about 700° C., thereby minimizing permeation of tritium from the reactor.

In satisfaction of the foregoing objects and advantages, there is provided by the present invention a method for the recovery of tritium from tritiated compounds comprising the steps of heating tritiated water to temperatures of about 600° C., thus producing superheated steam. The steam is then injected, along with any other tritiated compounds, into a reactor chamber charged with a mixture of uranium and an inert substance. The injected steam undergoes a highly exothermic reaction with the uranium causing reaction temperatures to occur in excess of 1100° C. As a result, substantially complete decomposition of the steam occurs to remove tritium therefrom. During the reaction, substantially all the uranium is converted to uranium dioxide which functions, in conjunction with the inert substance, as an insulator tending to prevent the reactor side walls facing the chamber from attaining the reaction temperatures to thereby minimize tritium permeation rates through the reactor side walls. The uranium dioxide and inert substance also function as a diluent to allow for volumetric expansion of the uranium within the chamber as it reacts with the steam to form uranium dioxide. Pure tritium is ultimately recovered from the reactor as a product of the aforesaid reaction.

Preferably, the tritiated compounds are initially injected into a preheater prior to injection into the reactor assembly. Too, the reactor assembly itself is preferably preheated to maintain the steam injected into the reaction chamber from the preheater at an initial, minimum temperature within the chamber sufficient to initiate and sustain the highly exothermic reaction. The preheating temperature in both the preheater and reaction chamber is preferably about 500° to 630° C. Preheating of both the preheater and reaction chamber can be performed with a tubular furnace.

In accordance with a further aspect of the invention, the uranium particles charged within the reaction chamber are less than 20 microns in diameter so that each particle can completely react with the steam resulting in substantially complete conversion of uranium to uranium dioxide. Further, to enable complete utilization of the uranium charged within the chamber the reactant mixture of uranium with an inert substance such as uranium dioxide is preferably about 2 parts by weight of uranium dioxide to 1 part by weight of uranium.

By injecting steam into the upstream end of the reaction chamber at an injection rate permitting reactor center line temperatures to exceed 1100° C., substantially all the uranium is oxidized during the reaction process. The uranium dioxide prevents reactor temperatures prevailing in the chamber from heating the reactor side walls to temperatures above about 700° C., thereby preventing excessive tritium permeation rates through the reactor side walls.

To further prevent excessive tritium permeation rates through the reactor side walls from occurring, the reaction preferably occurs within a stainless steel outer vessel surrounding the reaction chamber and which is of sufficient mass so as to function as a heat sink preventing the reactor side walls from approaching high temperatures. By forming the reactor side walls from a disposable copper liner, the uranium is prevented from alloying with the stainless steel outer vessel.

To carry out the foregoing method of the present invention, there is further provided by the present invention an apparatus for recovering tritium from tritiated water and tritiated species such as methane and ammonia or the like. The apparatus comprises a means connected to receive a supply of tritiated water for preheating same to temperatures of about 600° C. A reactor means is provided and is formed with a reaction chamber charged with a mixture of uranium and an inert substance for decomposing the steam to recover tritium therefrom via an exothermic reaction of uranium with steam. The reaction tends to induce temperatures in the reaction chamber in excess of 1100° C. to effect complete recovery of tritium from tritiated methane, ammonia or the like. The reactor means further includes an outer vessel having wall means establishing the reaction chamber within the vessel. The wall means is formed of a material and the outer vessel is of sufficient thickness to conduct heat from the reactor chamber at heat transfer rates sufficient to prevent the wall means and vessel from attaining temperatures prevailing in the reaction chamber. Means is connected to receive tritium from the reactor chamber upon completion of the reaction and discharge of tritium therefrom.

Preferably, the outer vessel is stainless steel of sufficient mass alowing it to also function as a pressure vessel capable of withstanding pressures generated in the reaction chamber. The wall means is preferably a copper liner separating the stainless steel outer vessel from the chamber to prevent alloying of the stainless steel vessel with uranium that tends to occur at the reaction temperature.

A pair of end caps are preferably provided to respectively seal opposite ends of the reaction chamber. The upstream end cap is formed with an injection port communicating with the preheater assembly to inject steam into the upstream end of the reaction chamber. A frit is interposed between the injection port and chamber to prevent the escape of uranium particles and to uniformly disperse steam passing therethrough into the chamber. To support the frit in a fixed position, a washer is positioned between the frit and reaction chamber in contact with the frit. The washer preferably has an outer diameter enabling outer circumferential edges thereof to abut against an upstream end of the copper liner. The washer can also be formed with a tab engageable with a positioning slot formed in a side wall of the copper liner.

In accordance with another aspect of the present invention, the upstream end cap can be formed with a tubular extension having a central passage for transmitting steam from the preheater assembly to the injection port of the reaction chamber. A compression coupling can be used to connect the tubular extension of the end cap to a like tubular extension of the preheater.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is now made to the drawings accompanying the application wherein:

FIG. 1 is a detailed longitudinal sectional view of the preheater and reactor assembly constructed in accordance with the present invention;

FIG. 2 is a sectional view of an end cap of the reactor assembly taken along the line 2—2 of FIG. 1;

FIG. 3 is an enlarged partial sectional view of a frit/washer arrangement used to direct steam into the reactor; and FIG. 4 is a front view of the marker shown in FIG. 3.

DETAILED DESCRIPTION OF THE INVENTION

The present invention is concerned with the recovery of tritium from tritiated compounds by reaction with uranium and apparatus and conditions by which this process can be carried out efficiently. Although tritium can be recovered from tritiated water at modes treaction temperatures (for example, 400° C.), higher temperatures result in more complete utilization of the uranium. Further, methane and ammonia reduction require much higher temperatures (for example, 900° C.) where material compatibility and tritium permeation through reactor walls become important considerations. For example, as reported by Bartlett et al, in Proceedings of Ninth Symposium on Engineering Problems of Fusion Research, Chicago, Ill., I.E.E.E. 1981, p. 2084, and by Anderson et al, in J. Vac. Sci. Technol. Al(2), 1982, p. 849, the Tritium Systems Test Assembly at Los Alamos National Laboratory, uranium at 900° C. is used to remove nitrogen, carbon and oxygen in the fuel cleanup system.

The present invention recognizes that the next generation of fusion reactors will require the processing of kilogram quantities of tritium. Because of its high cost (i.e., about $10,000 per gram) and toxicity, tritium containment is of great importance. At present, practically all tritium containment systems are based on the catalytic oxidation of tritium to tritiated water followed by freeze-out of the water or adsorption on molecular sieves. In the fuel cleanup system, other tritium species such as methane, ammonia and water will be produced in the presence of large quantities of tritium and deuterium. In view of the known reaction of tritiated compounds with hot uranium, that procedure seems an attractive method by which the tritium can be recovered.

Electrolysis would appear to be the method of choice to achieve recovery of the tritium because of the absence of waste products. However, tritium-compatible electrolysis cells have yet to be demonstrated as efficient recovery systems. The use of hot metal beds of uranium or magnesium operated isothermally at about 400° C. to decompose water is also known. However, operation at 400° C. does not result in complete utilization of the metal, and is not hot enough to decompose ammonia and methane. Heating of existing, known reactors to 1000° C. is not feasible due to material compatibility problems and loss of tritium due to permeation.

The present invention concerns a novel method and reactor design and system to recover tritium from tritiated water by reaction with uranium. The present invention provides a reactor and method whereby reaction temperatures well beyond the melting point of uranium (1133° C.) results in complete decomposition of the water and 100% conversion of the uranium to uranium dioxide. The reactor utilizes a disposible liner to minimize waste and allows reaction temperatures high enough to decompose water and coinjected tritiated hydrocarbons and ammonia, while maintaining wall temperatures low enough that tritium permeation rates are tolerable. The temperatures are a result of the highly exothermic reaction between water and uranium and are controlled by the rate of addition of water. The reactor assembly and reaction conditions of the present invention take advantage of the highly exothermic uranium-water reaction to create local temperatures high enough to completely consume the uranium particles while maintaining wall temperatures low enough to mitigate material compatability and tritium permeation problems.

In the preferred embodiment, a disposable copper liner is maintained in the reactor which minimizes contaminated waste and expense. The temperatures which were obtained using this reactor are far in excess of those required to quantitatively decompose coinjected hydrocarbons and ammonia. Thus, the present invention provides an efficient high temperature reactor and system which can result in complete conversion of the reactants and improved results in recovery of the tritium.

The method of the present invention is applicable to all types of tritiated compounds which are gaseous at 600° C. and react with uranium to form oxides, nitrides, or carbides.

Important features of the invention are to be found in the reactor and preheater assembly used in the system. The important features of the reactor design include a massive stainless steel outer vessel which serves as a pressure vessel and a heat sink, and a removable copper liner. The liner is removable to minimize waste and expense. It is preferably constructed of copper to prevent alloying of stainless and uranium, which would otherwise occur at the temperatures of the reaction. An injection port for water is at the front of the reactor. A preheater is provided as a separate detachable vessel mounted just upstream of the reactor. The reaction occurs in a moving reaction front throughout the complete diameter and length of the reactor volume. The temperatures of the reaction are high enough to decompose the water and coinjected tritiated hydrocarbons and ammonia while maintaining wall temperatures low enough so that tritium permeation rates are tolerable. The local temperatures created within the reactor are high enough to completely consume the uranium particles while maintaining wall temperatures low enough to mitigate material compatibility problems. A plurality of thermocouple probe locations are preferably located along the reactor to give good indications of temperatures of the reaction, but these are necessary only until all aspects of the reaction are understood. The reaction occurs as a moving front reaction from the point where the water enters the reactor and then down through the reactor until the uranium is exhausted. The reactor is in effect, then, a batch processor.

In initiating the reaction, the reactor is initially charged with a mixture of uranium and uranium dioxide. The preferred ratio of uranium dioxide to uranium in this mixture is about 2:1 since this ratio gave the best results for reactor design and the water injection rate employed. A ratio of 1:1 resulted in higher temperatures but it is theorized that lower water addition rates would mitigate that problem. Ratios lower than 1:1 may cause problems due to expansion of the uranium upon reaction, unless other measures were taken to increase the void volume.

The mixture of uranium dioxide and uranium is preferably packed to about 50% of the theoretical density. The uranium dioxide is refractory, a good insulator, and serves as a heat sink and diluent to lower the energy density and allow for the volume expansion as uranium reacts to form uranium dioxide. The uranium particles are preferatly small in size ranging from 4 to 16 microns in diameter so that the uranium water reaction is controlled by the rate of water addition, rather than by diffusion through the growing oxide film.

The reactor is initially heated at least to about 630° C. by any convenient means such as a tubular furnace. Water is injected into the preheater which is filled with the powdered uranium dioxide and heated to 600° C. For the reactor geometry shown in the drawings, a water injection rate of about 0.05 gram/moles per minute results in reactor center line temperatures of about 1200° C. with the copper liner remaining below 800° C. Water is quantitatively reduced with complete reaction of the uranium occurring in a reaction zone of only 1.5 millimeters in length.

All water is injected into the front of the reactor, as there are not other water injection ports. In the preheater, the water is preferably heated to about 600° C. Efficiency falls off rapidly with temperatures below about 500° C. The function of the preheater is to convert the injected water into superheated steam. Uranium dioxide is used as the heat transfer medium but other inert substances would be operable. The water is drawn from a water reservoir into a syringe using a linear actuator. When the reservoir is valved off, the water is then injected into the preheater reactor assembly.

In a preferred embodiment of the invention, water is injected at a constant rate of, for example, 0.05-0.5 moles per minute into the preheater at 600° C. where it is converted to superheated steam. The steam then flows into the reactor, also at about 600° C., which is filled with the mixture of fine particle uranium and the uranium dioxide as diluent. In the reactor, the water reacts to form uranium dioxide and hydrogen. The hydrogen is collected in calibrated volumes and its pressure is monitored as a function of time. One or more thermocouples can be spaced at equal intervals along the longitudinal axis of the reactor to measure temperature.

In recoverying tritium from tritiated water or other tritiated molecules, the tritiated water would be introduced through the water injection port. Mixtures of other tritiated compounds would be coinjected with the water.

The advantages of the reactor and system of the present invention provide an isothermal reactor which is at a high enough temperature to insure that the reaction takes place on the introduction of steam. Superheated steam can be introduced at a constant rate. Well characterized uranium particles are used which are small enough to insure that diffusion is not rate limiting, and the uranium dioxide diluent is added to limit energy density and to keep the bed characteristics, mainly void volume and thermal conductivity, from changing too drastically in the reaction zone.

The rate of heat generation per unit volume of reactor is calculated using the known heat of reaction and the experimentally determined rate of hydrogen generation and rate of reaction front propagation. Thus, the thermal conductivity of the bed behind and ahead of the reaction front can be varied to match the experimentally determined temperature profiles. On refinement, one can predict the overall temperatures and peak center line temperatures that will result from a given rate of water injection.

Reference will now be made in detail to the present preferred embodiment of the invention, an example of which is illustrated in the accompanying drawing. Referring first to FIG. 1, reactor 10 of the invention is connected to receive steam from preheater assembly 15. Preheater assembly 15 comprises an outer vessel 17 having formed within an elongate preheating chamber 19. An upstream end of preheater 15 is closed with an end cap 20, a plurality of bolts (not shown) and sealing ring 22. The cap 20 has a central inlet passage 24 connected to receive tritiated water from a water reservoir (not shown) that is supplied to the upstream end of chamber 19 filled with uranium dioxide powder 26. As mentioned above, outer vessel 17 is preheated with, for example, a tubular furnace (not shown) to temperatures of about 600° C. The uranium dioxide powder 26 charged within preheating chamber 19 cooperates with the outer vessel wall 17a to retain heat within the preheater to prevent recondensing of steam into water.

A frit 30 is located at the downstream end of preheating chamber 19 to retain uranium dioxide powder 26 in chamber 19. A backup washer 32 positioned downstream and immediately adjacent frit 30 supports the frit in the chamber. Washer 32, as best shown in FIG. 4, is formed with a single aperture 33 permitting the steam to pass therethrough into a downstream end 34 of the chamber 19. Washer 32 also includes a series of raised formations 33a formed on one side of the washer in supporting contact with frit 30. The formations 33a establish therebetween a series of annular passages 33b communicating with radial passages 33c that direct steam passing through the frit (over its entire diameter) into aperture 33.

Discharge passage 35 extends into a tubular extension 36 of vessel 17 that is connected via compression couplings 38 to a like tubular extension formed integral with an end cap 40 closing off the upstream end of reaction chamber 42. More specifically, as shown in FIG. 1, steam is supplied through an inlet passage 44 formed in end cap 40 for injection into the upstream end of the reaction chamber. The steam enters and is uniformly dispersed within the chamber through a frit 45 that is supported with washer 47. The washer 47 is similar to washer 32 and contains a single aperture 33 through which steam passes into the upstream end of the reaction chamber. As shown in FIG. 3, the outer circumferential edge 48 of washer 47 abuts against the upstream end of copper liner 50 to prevent steam from escaping into an area between the copper liner and outer vessel 55. The washer 47 may be formed with tabs 51 engageable with slots 52 formed in the copper liner so to facilitate proper placement and orientation of the washer in sealing contact with the liner. A sealing ring 57 interposed between the end cap and the outer vessel prevents steam from escaping into an area therebetween to the external environment.

As mentioned above, the reaction chamber is charged with a mixture of uranium and uranium dioxide particles 58, 59 which are well mixed. The reaction occurs as a moving front reaction as discussed above. The uranium dioxide in cooperation with the thickness of mass of the stainless steel outer vessel 55 controls the rate of heat transfer from the reaction chamber 42 so that the copper liner 50 as well as the stainless steel outer vessel 55 are maintained at temperatures low enough so that tritium permeation rates are tolerable. The copper liner 50 extends continuously to define the reaction chamber side wall and prevent alloying of the uranium with the stainless steel outer vessel.

Upon completion of the aforesaid reaction in chamber 42, tritium passses through a central discharge passage 63 formed in downstream end cap 62 secured to vessel 55 with bolts 61 (see FIG. 2). To prevent leakage of reaction byproducts from an interface formed between end cap 62 and vessel 55, seal rings 65, 67 are provided. The uranium and uranium dioxide mixture 58, 59 is retained within chamber 42 by means of frit 68 supported in an upsteam location from passage 63 by a washer similar to washer 33. End cap 62 can be formed with a tubular extension and compression coupling 38 connectable to a collection means (not shown) as is well known in the art.

To facilitate mounting and proper alignment of end caps 20, 40 and 62 to their respective ends of the reactor and preheater assemblies, alignment slots 70 and 72 are formed on the outer surfaces of preheater vessel 17 and outer vessel 55.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment is chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. Apparatus for recovering tritium from tritiated water and tritiated species such as methane and ammonia and the like, comprising:
   (a) reactor means having a reactor chamber charged with a mixture of uranium and a first inert substance, said mixture for decomposing an injected steam mixture to recover tritium therefrom via an exothermic reaction of said uranium with the steam, said reaction inducing temperatures in the reaction chamber in excess of the melting of uranium, said reactor means including an outer vessel having wall means establishing said reaction chamber with in the vessel, said wall means being formed of material that prevents a reaction between the outer vessel with uranium, said inert substance being a refractory material and said outer vessel being of sufficient thickness to conduct heat at heat transfer rates sufficient to prevent the wall means and vessel from attaining center line temperatures prevailing in the reaction chamber;

(b) preheating means connected to said reactor means for receiving a supply of tritiated water for preheating said tritiated water to temperatures of about 600° C.; and (c) receiving means connected to said reaction chamber for receiving tritium from said reaction chamber.

2. The apparatus of claim 1, wherein said preheating means includes a heating chamber located upstream of the reactor means, said heating chamber containing a second inert substance functioning as a heat transfer medium for uniformly preheating to convert into steam substantially all of said tritiated water supplied to the preheating means.

3. The apparatus of claim 2, wherein said second inert substance is uranium dioxide.

4. The apparatus of claim 1, wherein said first inert substance is uranium dioxide mixed with said uranium at a predetermined ratio to affect complete conversion of uranium to uranium dioxide by enabling said reaction to occur as a moving front reaction.

5. The apparatus of claim 4, wherein the predetermined ratio of the reactant mixture is 2 parts by weight of uranium dioxide to 1 part by weight of uranium packed to a theoretical density of about 50%.

6. The apparatus of claim 5, wherein the diameter of uranium particles of the reactant mixture is approximately 4 to 16 microns so that substantially all of the uranium particles in the chamber react with the steam and enabling the reaction to be controlled by the rate of injection of steam into the reactor rather than by diffusion through a resultant oxide film established by the reaction.

7. The apparatus of claim 1, wherein said outer vessel is made of stainless steel of sufficient mass to function as a pressure vessel capable of withstanding pressures generated in the reaction chamber.

8. The apparatus of claim 7, wherein said wall means is a copper liner separating the stainless steel outer vessel from the chamber to prevent alloying of said stainless steel vessel with said uranium tending to occur at said reaction temperature.

9. The apparatus of claim 8, further including a pair of end caps respectively fixed to seal opposite ends of the reaction chamber and respectively including an injection port and a discharge port, the injection port communicating with the preheater assembly to inject steam into the upstream end of the reaction chamber.

10. The apparatus of claim 9, further including a frit interposed between the injection port and the reaction chamber to uniformly disburse steam passing therethrough into the chamber.

11. The apparatus of claim 10, further including a washer positioned between the frit and reaction chamber to maintain the frit in fixed position.

12. The apparatus of claim 11, wherein said washer has an outer diameter sufficient to enable outer circumferential edges thereof to abut against the upstream end of the liner.

13. The apparatus of claim 12, wherein said washer is formed with a tab engageable with a slot formed in a side wall of the copper liner, said slot opening into the upstream end of the liner.

14. The apparatus of claim 13, wherein the upstream end cap is formed with a tubular extension having a central passage for transmitting steam from the preheater assembly to the injection port for passage into the reaction chamber, and a compression fitting coupling the tubular extension of the cap to a like tubular extension of the preheater assembly extending downstream of the preheater in communication with the preheating chamber.

* * * * *